United States Patent [19]
Henschel et al.

[11] Patent Number: 5,302,019
[45] Date of Patent: Apr. 12, 1994

[54] APPARATUS FOR MIXING AND/OR KNEADING MATERIALS

[75] Inventors: Werner Henschel, Giebenbach; Kurt Heuberger, Tecknau, both of Switzerland

[73] Assignee: Buss AG, Basel, Switzerland

[21] Appl. No.: 989,120

[22] Filed: Dec. 11, 1992

[30] Foreign Application Priority Data

Dec. 14, 1991 [DE] Fed. Rep. of Germany ....... 4141328

[51] Int. Cl.⁵ .......................... B29B 1/04; B01F 7/08; B01F 15/06
[52] U.S. Cl. ......................................... 366/80; 366/90; 366/149
[58] Field of Search .................... 366/80, 308, 303, 78, 366/79, 90, 322, 324, 307, 98, 99, 144, 149; 425/207, 208, 209

[56] References Cited

U.S. PATENT DOCUMENTS

| | | | |
|---|---|---|---|
| 4,199,263 | 4/1980 | Menges | 366/90 |
| 4,304,054 | 12/1981 | Nauck | 366/90 |
| 4,723,901 | 2/1988 | Sarumaru | 366/307 |
| 4,960,328 | 10/1990 | Schumacher | 366/90 |

*Primary Examiner*—Robert W. Jenkins
*Attorney, Agent, or Firm*—Tarolli, Sundheim & Covell

[57] ABSTRACT

The invention provides an apparatus for mixing and kneading materials comprising a housing defining a mixing and kneading chamber, a jacket member enclosing the mixing and kneading chamber and a mixing and kneading member located in the interior of the mixing and kneading chamber. The mixing and kneading member is driven to a rotating and/or oscillating motion. For supporting the mixing and kneading operation, projection members are provided protruding from the jacket member into the interior of the mixing and kneading chamber. In order to simplify the design of the apparatus and, particularly, to improve the heating and cooling of the mixing and kneading chamber, at least some of the projection members are connected directly to the jacket member, or at least some of the projection members are integrally formed with the jacket member thus constituting a common jacket member/projection member unit.

20 Claims, 4 Drawing Sheets

5,302,019

APPARATUS FOR MIXING AND/OR KNEADING MATERIALS

FIELD OF THE INVENTION

The present invention refers to an apparatus for mixing and/or kneading materials, comprising a housing defining a mixing and kneading chamber, a jacket member enclosing the mixing and kneading chamber and having a central axis, a mixing and kneading member located in the interior of the mixing and kneading chamber, means for driving the mixing and kneading member to a rotating and/or oscillating motion, and means for supporting the mixing and/or kneading operation in the form of protrusions projecting into the mixing and kneading chamber.

With such an apparatus, different starting materials are processed in order to obtain the desired intermediate products or final products. In view of the fact that the starting materials to be processed become more and more elaborate, the temperatures during processing of these materials become more and more extreme and have to be observed very precisely.

In order to observe a precise operating temperature in a mixing and/or kneading apparatus during the processing of raw materials, the apparatus must be provided with means for cooling and/or heating it, that is, usually its housing defining the operating chamber of the apparatus. Therefore, the housing of the apparatus usually is provided with channels in which a cooling or heating medium circulates. It is understood that this medium is heated for bringing the mixing and/or kneading apparatus to a required elevated operation temperature, or that this medium is cooled for bringing the mixing and/or kneading apparatus to a required reduced operation temperature.

For heating such a mixing and/or kneading apparatus, electrically operated heating means can be used. Such means usually comprise one or more heating plate members being connected in thermal contact to the housing of the mixing and/or kneading apparatus. In this case, the channels for circulating a medium is used just for cooling the housing of the apparatus if the operation parameters require a lowering of the temperature.

As the temperature of the materials to be processed in such a mixing and/or kneading apparatus oftenly amounts, with the present technology in mind, to 350° C. and more, the efficiency of the required heating and/or cooling means is of paramount importance. In this connection, it is especially important that the supply or removal of the heat within the apparatus is effected in an evenly distributed manner; in other words, the housing of the mixing and/or kneading apparatus and, thereby, the operating chamber with the materials contained therein must be evenly heated and/or cooled such that, even locally, no too high temperatures can occur which temperatures would be dangerous or even destructive not only for the mixing and/or kneading apparatus, but also for the materials to be processed in the operating chamber of the apparatus.

An apparatus for mixing and/or kneading materials, as it is used today, usually comprises a housing consisting of two portions; the two portions, when assembled to a closed housing, define an operating chamber, in other words the mixing and kneading chamber, in which there is arranged a jacket member surrounding the operating chamber. The purpose of this jacket member is to increase the service time or useful life of the apparatus. This goal is achieved by the fact that the jacket member is made of a material which is resistive against mechanical abrasion, heat and chemical influences. In the interior of the operating chamber, there are provided so-called kneading bolts, i.e. projections which serve to support a good mixing and kneading of the materials to be processed in the operating chamber by the rotating and/or oscillating mixing and kneading member. In order to provide for a prolonged service time of these kneading bolts, these elements are made of a material which is resistive against mechanical abrasion, heat and chemical influences as well. In such a mixing and kneading apparatus as used today, the housing and the jacket member is provided with coincident bores in which the aforementioned kneading bolts are secured. In other words, the kneading bolts are penetrating the housing and the jacket member, protrude into the operating chamber and are fixed to the housing at its outer side.

If the housing of the mixing and kneading apparatus must be heated up to a high temperature during the processing of certain materials, it must be considered that the medium circulating in the heating and cooling channels, in a first step, provides enough heat energy to the operating chamber and, in a second step, if required, removes the heat from the operating chamber. In order to ensure the required or desired heating and/or cooling of the operating chamber and, particularly, an even distribution of the temperature in the housing of the mixing and kneading apparatus, the channels in which the heating and cooling medium circulates should be distributed around the operating chamber evenly and concentrically.

However, in most cases, it is necessary to provide quite a large number of the aforementioned kneading bolts. The consequence is that the housing of the mixing and kneading apparatus must be provided with a large number of bores for the kneading bolts, and therefore the circulation channels for the heating and cooling of the apparatus cannot be provided in the required number and distribution. Thus, there is a danger that the mixing and kneading apparatus and consequently the materials to be processed therein cannot be heated or cooled in the required manner. In other words, the required process temperatures can be maintained only within relatively wide limits and the danger occurs that significant local temperature differences are observed in the housing.

OBJECTS OF THE INVENTION

It is an object of the present invention to improve a mixing and/or kneading apparatus such that the housing of the apparatus and, thereby, the operating chamber of the apparatus can be evenly heated or cooled even if a large number of kneading bolts is present.

It is a further object of the present invention to improve a mixing and/or kneading apparatus such that a great number of circulating channels for a heating or cooling medium can be evenly and concentrically arranged around the operating chamber of the apparatus.

It is a still further object of the present invention to improve a mixing and/or kneading apparatus such that the design of the apparatus is simpler and that worn-out kneading bolts and/or jacket member can be replaced easily and with less expenditure.

SUMMARY OF THE INVENTION

In order to achieve these and other objects, the invention provides, according to a first aspect, an apparatus for mixing and/or kneading materials comprising a housing defining a mixing and kneading chamber, a jacket member enclosing the mixing and kneading chamber and having a central axis, a mixing and kneading member located in the interior of the mixing and kneading chamber, means for driving the mixing and kneading member to a rotating and/or oscillating motion, and means for supporting the mixing and/or kneading operation.

The last mentioned means comprise projection members protruding from the jacket member into the interior of the mixing and kneading chamber, whereby at least some of the projection members are connected directly to the jacket member.

According to a second aspect, the invention provides an apparatus for mixing and/or kneading materials comprising a housing defining a mixing and kneading chamber, a jacket member enclosing the mixing and kneading chamber and having a central axis, a mixing and kneading member located in the interior of the mixing and kneading chamber, means for driving the mixing and kneading member to a rotating and/or oscillating motion, and means for supporting the mixing and/or kneading operation, said means comprising projection members protruding from said jacket member into the interior of said mixing and kneading chamber. At least some of the projection members are integrally formed with the jacket member thus constituting a common jacket member/projection member unit.

According to a preferred embodiment, the apparatus for mixing and/or kneading materials comprises a housing defining a mixing and kneading chamber, a jacket member enclosing the mixing and kneading chamber, a mixing and kneading member located in the interior of the mixing and kneading chamber, and means for driving the mixing and kneading member to a rotating and-/or oscillating motion.

Further, there is provided a first plurality of kneading pins distributed along the circumference of the jacket member, projecting into the interior of the mixing and kneading chamber and integrally formed with the jacket member, and a second plurality of kneading pins distributed along the circumference of the jacket member, directed against the central axis of the jacket member and penetrating the housing in essentially radial direction with regard to the central axis of the jacket member.

Further, the invention provides a jacket member for an apparatus for mixing and/or kneading materials as hereinbefore defined. Thereby, the means for supporting the mixing and/or kneading operation comprise projection members protruding from the jacket member into the interior of the mixing and kneading chamber. At least some of the projection members are connected directly to said jacket member or are integrally formed with the jacket member thus constituting a common jacket member/projection member unit.

BRIEF DESCRIPTION OF THE DRAWINGS

In the following, there will be described a mixing and kneading apparatus according to the prior art as well as well as an embodiment of the mixing and kneading apparatus according to the invention, with reference to the accompanying drawings, in which:

FIG. 3a a schematic cross sectional view of a detail regarding the mounting of a kneading bolt.

DETAILED DESCRIPTION OF THE DRAWINGS

Figure 1:
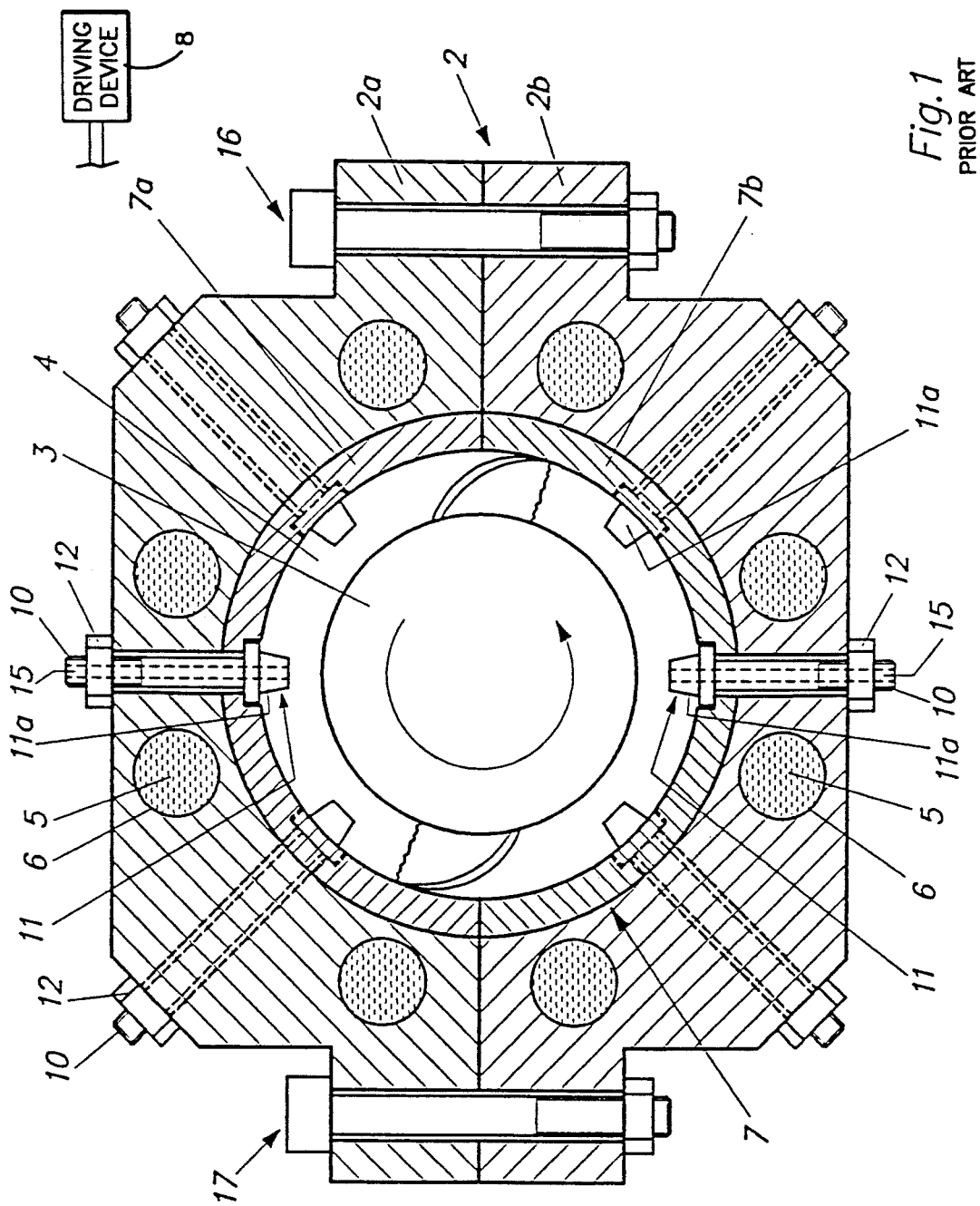
FIG. 1 shows a schematic cross sectional view of a mixing and kneading apparatus according to the prior art.

The embodiment of a mixing and kneading apparatus shown in FIG. 1 and known in the prior art comprises a housing 2 with a first housing portion 2a and a second housing portion 2b. The two housing portions 2a and 2b are connected to each other by screw means schematically shown as threaded bolts and nuts 16 and 17. The two housing portions 2a and 2b define and enclose a cylindric operating chamber 4. In the interior of the cylindric operating chamber 4, there is provided a operating member 3 in the form of a mixing and/or kneading worm member which is driven to a rotating and/or oscillating motion by a driving device 8 known in the art and shown schematically in the drawing.

As can be seen in FIG. 1, the operating chamber 4 is enclosed by a jacket member 7 comprising a first shell portion 7a and a second shell portion 7b. In order to ensure a good and intensive mixing and/or kneading of the material filled into the operating chamber 4, a plurality of projections 11 in the form of kneading bolts 11a is provided. The projections 11 are arranged around the periphery of the operating member 3 in different axial symmetry planes and secured to the first and second shell portions 7a and 7b and to the first and second housing portions 2a and 2b, respectively, by means of threaded pins 10 and nuts 12.

Thus, the kneading bolts 11a with the threaded pins 10 are penetrating the first and second housing portions 2a and 2b, respectively, and take up a lot of space in the housing portions 2a and 2b. Consequently, only a limited number of cooling and/or heating medium channels 6 containing a cooling and/or heating medium 5 circulating therein can be arranged in the housing portions 2a and 2b. The result is that relatively large and wide portions of the housing portions 2a and 2b are left in the housing 2 which cannot be provided with cooling and/or heating medium channels 6 containing a cooling and/or heating medium 5 circulating therein; thus, the housing 2 cannot be cooled and/or heated with the required equal distribution of temperature.

Figure 2:
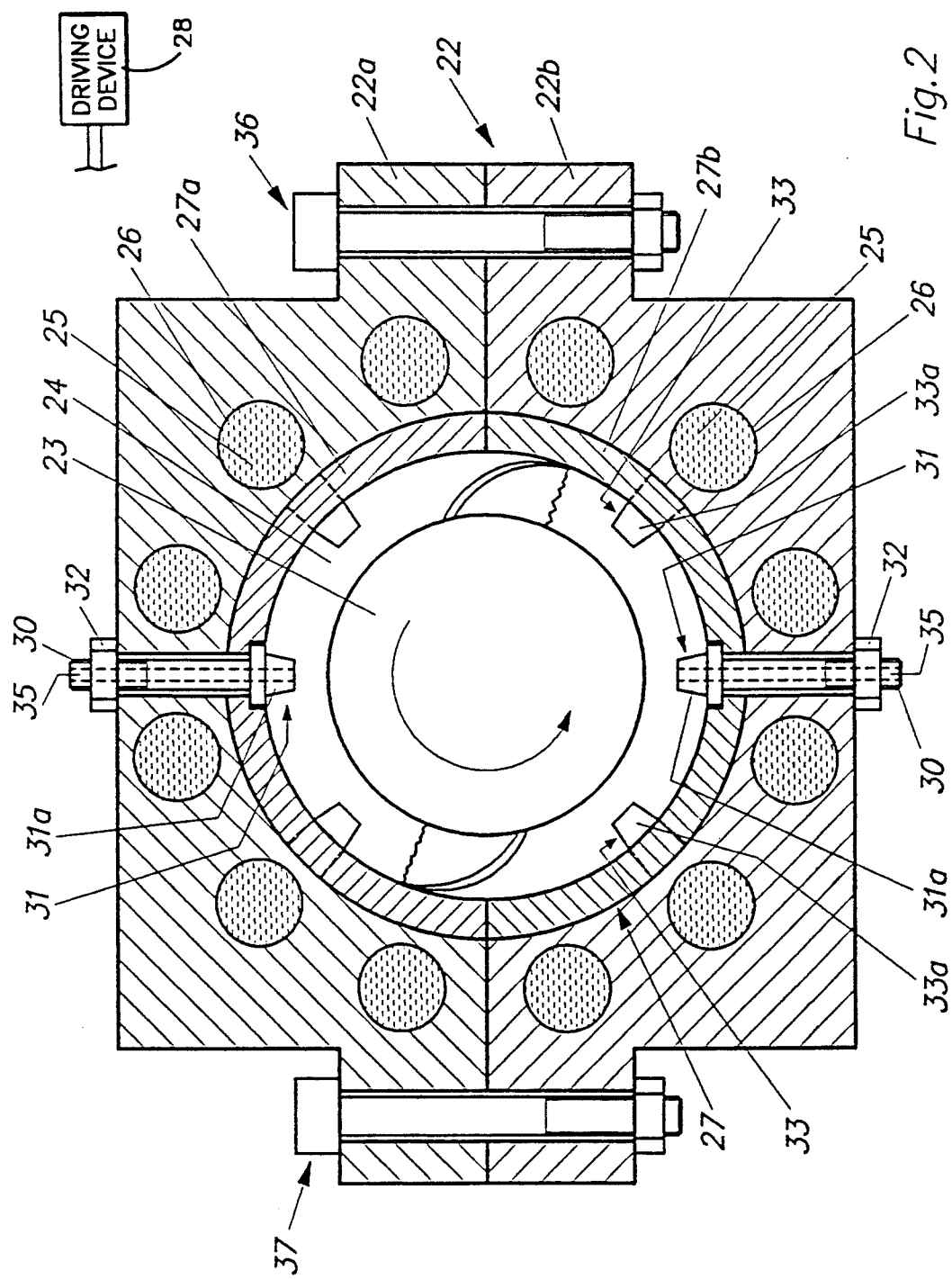
FIG. 2 shows a schematic cross sectional view of a mixing and kneading apparatus according to the present invention.

The embodiment of a mixing and kneading apparatus shown in FIG. 2 and designed in accordance with the present invention again comprises a housing 22 with a first housing portion 22a and a second housing portion 22b. The two housing portions 22a and 22b are connected to each other by screw means schematically shown as threaded bolts and nuts 36 and 37. The two housing portions 22a and 22b define and enclose a cylindric operating chamber 24. In the interior of the cylindric operating chamber 24, there is provided a operating member 23 in the form of a mixing and/or kneading worm member which is driven to a rotating and/or oscillating motion by a driving device 28 known in the art and shown schematically in the drawing.

As can be seen in FIG. 2, the operating chamber 24 containing the operating member 23 is enclosed by a jacket member 27 comprising a first shell portion 27a and a second shell portion 27b. The first and second shell portions 27a and 27b, respectively, are connected to the first and second housing portions 22a and 22b, respectively, by means of connecting members 30 and nuts 32. The portions 31 of the connecting members which are in the form of threaded pins 30 projecting into the operating chamber 24 are designed as kneading bolts 31a. In order to ensure a good and intensive mixing and/or kneading of the material filled into the operating chamber 24, a plurality of projections in the form of kneading bolts 33a is provided. Similarly to the embodiment shown in FIG. 1, the kneading bolts 31a are arranged around the periphery of the operating member 23 in different axial symmetry planes.

In contrary to the prior art design shown in FIG. 1, the kneading bolts 33a are directly connected to the first shell portion 27a and the second shell portion 27b. Thus, it is not necessary to provide means penetrating the first and second housing portions 22a and 22b, respectively, for fixing the kneading bolts 33a. The result is that the channels 26 containing the cooling or heating medium 25 can be arranged concentrically around the operating chamber 24 in equally spaced and tight relationship and in sufficient number. By this design, it is ensured that the first and second housing portions 22a and 22b, respectively, and, thereby, the material contained and processed in the operating chamber 24 is evenly cooled or heated and that an equal temperature distribution can be maintained over the entire cross section of the housing 22.

Due to the fact that less troublesome threaded pins with kneading bolts connected thereto have to be arranged penetrating the housing of the mixing and kneading apparatus, a further advantage of the invention can be seen in an embodiment (not shown in the drawings) in which an electric heating member is used. In such an embodiment, the required heating plate can be designed simpler and having a greater contact area to the housing of the mixing and kneading apparatus. Thus, the transfer of heat from the heating plate to the housing is realized over a much larger area with the result that the heating of the housing of the mixing and kneading apparatus is more equal.

Figure 3:
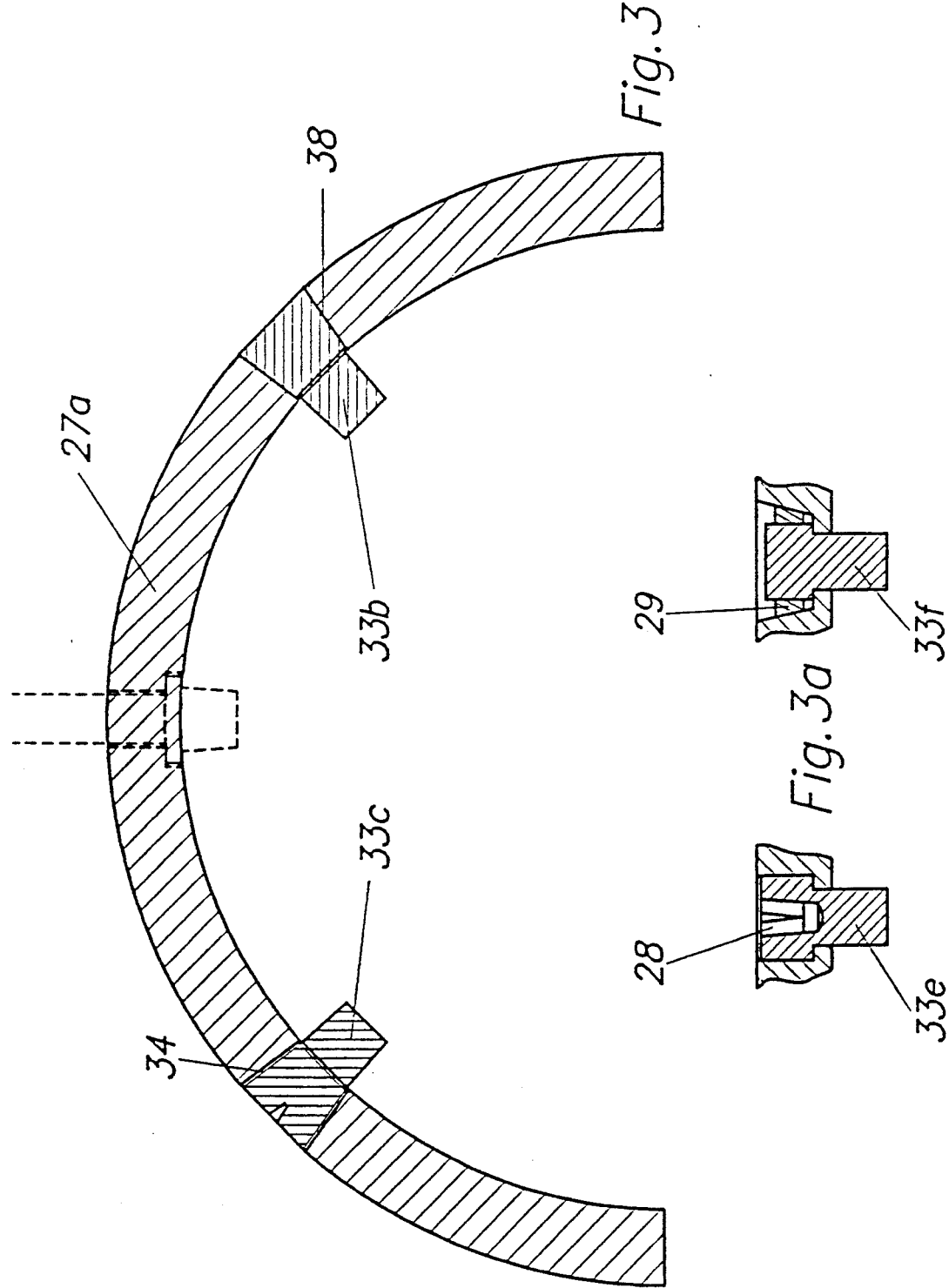
FIG. 3 shows a schematic cross sectional view of a first embodiment of a jacket member for a mixing and kneading apparatus according to the present invention.

FIG. 3 shows, in a larger scale, a cross sectional view of a first embodiment of the first shell portion 27a being provided with kneading bolts 33b and 33c. It is understood that the second shell portion 27b can be designed in corresponding manner.

This embodiment schematically shows two exemplary ways of mounting the kneading bolts 33b and 33c to the shell portion 27a. The kneading bolts 33c are fixed to the shell portion 27a by means of a thread 34, i.e. they are screwed into the shell portion 27a, and the kneading bolts 33b are fixed to the shell portion 27a by means of a friction seat 38. As a friction seat, for example a cone seat may be considered. The cone angle, thereby, is chosen such that the kneading bolt 33b is self-lockingly connected to the shell portion 27a.

FIG. 3a schematically shows further ways of connecting the kneading bolts to the shell portion 27a and 27b, respectively. As can be seen in the left hand part of this drawing, the kneading bolt 33e comprises a longitudinal axial bore. After inserting the kneading pin 33e into the a suitably designed aperture of the shell portion 27a and 27b, respectively, a conically shaped pin 28 is pressed into the aforementioned longitudinal axial bore provided in the kneading pin 33e. Thereby, the outer diameter of the kneading pin 33e is enlarged and rigidly fixed to the shell portion 27a and 27b, respectively, in the manner of a friction seat.

Another kneading pin 33f is inserted into a conical bore provided in the shell portion 27a and 27b, respectively, by means of a conically shaped washer 29. By pressing that kneading bolt 33f into the bore in the shell portion and against the conical washer 29, a similar friction seat can be realized.

It is understood that a wide variety of other press seats or shrink seats as well as other inseparable joints can be used to connect the kneading bolts to the shell portion.

Figure 4:
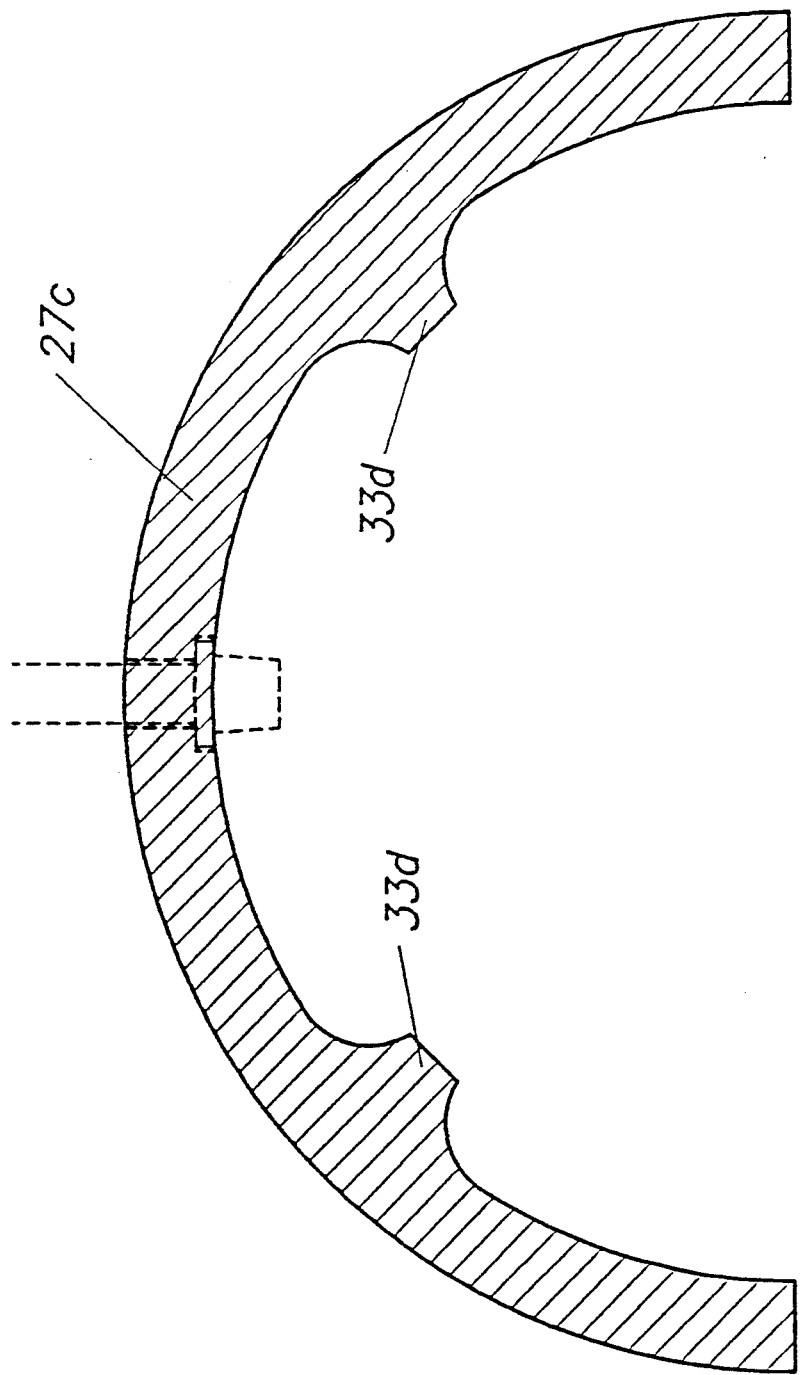
FIG. 4 shows a schematic cross sectional view of a second embodiment of a jacket member for a mixing and kneading apparatus according to the present invention.

FIG. 4 shows, in a larger scale, a cross sectional view of a second embodiment of a shell portion 27c being provided with kneading bolts 33d. It is understood that a second shell portion can be designed in corresponding manner or according to the embodiment shown in FIGS. 3 and 3a.

In the embodiment schematically shown in FIG. 4, the kneading bolts 33d are integrally formed with the shell portion 27c and protrude therefrom into the interior of the operating chamber.

It is understood that also other embodiments are possible, particularly as far as the number of the kneading bolts protruding into the operating chamber is concerned. Especially, also a shell portion and shell portions, respectively, may be realized in which a combination of integrally formed kneading bolts, as shown as kneading bolts 33d in FIG. 4, and rigidly connected kneading bolts, as shown as kneading bolts 33b or 33c or 33e or 33f in FIGS. 3 and 3a, are used. Such a design is evident for any person skilled in the art and, therefore, is not explicitly shown in the drawings.

The shell portions including the kneading bolts connected thereto are designed such that the together form a unit to be used as a jacket portion of a mixing and/or kneading apparatus according to the invention. Consequently, these shell portions can be put at the disposal of the operator of a mixing and/or kneading apparatus.

As the kneading bolts are subjected to a certain wear which may be different and pronounced, respectively, depending on the material to be worked in the mixing and/or kneading apparatus and the temperature in the operating chamber, the kneading bolts have to be replaced from time to time. With the present invention in mind, such replacement can be accomplished much cheaper than with embodiments known in the prior art. In other words, the present invention provides the possibility to replace just the kneading bolts in se which are connected to the jacket members and not the complete arrangement of kneading bolts, threaded pin assembly and nut penetrating the housing of the mixing and/or kneading apparatus. Furthermore, the waste of material is less which is, in present times, also an important factor.

What is claimed is:

1. An apparatus for mixing and/or kneading materials comprising:
    a housing defining a mixing and kneading chamber;
    a jacket member enclosing said mixing and kneading chamber;

a mixing and kneading member located in the interior of said mixing and kneading chamber;

means for driving said mixing and kneading member to a rotating and/or oscillating motion;

a first plurality of kneading pins distributed along the circumference of said jacket member, projecting into the interior of said mixing and kneading chamber and being integrally formed with said jacket member, and a second plurality of kneading pins distributed along the circumference of said jacket member, directed against said central axis of said jacket member and penetrating said housing in essentially radial direction with regard to said central axis of said jacket member.

2. An apparatus according to claim 1 in which said housing encloses said jacket member around its circumference in order to protect said kneading pins inserted or secured to said jacket member against loosening, removal or from being pushed outwards.

3. An apparatus for mixing and/or kneading materials comprising:

a housing defining a mixing and kneading chamber;

a jacket member enclosing said mixing and kneading chamber and having a central axis;

a mixing and kneading member located in the interior of said mixing and kneading chamber;

means for driving said mixing and kneading member to a rotating and/or oscillating motion;

means for supporting the mixing and/or kneading operation, said means comprising projection members protruding from said jacket member into the interior of said mixing and kneading chamber;

at least some of said projection members being connected directly to said jacket member;

said jacket member being connected to said housing member by means of connecting members distributed along the circumference of said jacket member, directed against said central axis of said jacket member and penetrating said housing in essentially radial direction with regard to said central axis of said jacket member.

4. An apparatus according to claim 3 in which said jacket member is in the form of a shell comprising a plurality of shell portions made of a material which is resistant to abrasion and corrosion.

5. An apparatus according to claim 4 in which said jacket member is in the form of a shell comprising a first shell portion and a second shell portion both made of a material which is resistant to abrasion and corrosion.

6. An apparatus according to claim 3 in which at least some of said connecting members project into the interior of said mixing and kneading chamber.

7. An apparatus according to claim 6 in which said connecting members projecting into the interior of said mixing and kneading chamber are in the form of kneading pins.

8. An apparatus according to claim 3 in which at least some of said connecting members are adapted to provide for an injection of gaseous and/or fluid and/or powdery media into the interior of said mixing and kneading chamber.

9. An apparatus according to claim 3 in which at least some of said connecting members are provided with a central longitudinal bore.

10. An apparatus according to claim 3 in which at least some of said connecting members are provided with sensor means for recording the kneading and/or mixing conditions in the interior of said mixing and kneading chamber.

11. An apparatus according to claim 3 in which said projection members are in the form of kneading pins.

12. An apparatus according to claim 3 in which at least some of said kneading pins are integrally formed with said jacket member.

13. A jacket member for an apparatus for mixing and/or kneading materials, said apparatus comprising:

a housing defining a mixing and kneading chamber;

said jacket member enclosing said mixing and kneading chamber and having a central axis;

a mixing and kneading member located in the interior of said mixing and kneading chamber;

means for driving said mixing and kneading member to a rotating and/or oscillating motion;

means for supporting the mixing and/or kneading operation, said means comprising projection members protruding from said jacket member into the interior of said mixing and kneading chamber;

at least some of said projection members being connected directly to said jacket member, said jacket member being made at least partially of ceramic material.

14. A jacket member for an apparatus for mixing and/or kneading materials, said apparatus comprising:

a housing defining a mixing and kneading chamber;

said jacket member enclosing said mixing and kneading chamber and having a central axis;

a mixing and kneading member located in the interior of said mixing and kneading chamber;

means for driving said mixing and kneading member to a rotating and/or oscillating motion;

means for supporting the mixing and/or kneading operation, said means comprising projection members protruding from said jacket member into the interior of said mixing and kneading chamber;

at least some of said projection members being connected directly to said jacket member;

said projection members being in the form of kneading pins, said kneading pins being made of an abrasion and corrosion resistive material, said kneading pins being made at least partially of ceramic material.

15. A jacket member according to claim 14 in which said kneading pins are connected to said jacket member by means of a screw thread.

16. A jacket member according to claim 14 in which said kneading pins are connected to said jacket member by means of a friction seat.

17. A jacket member according to claim 14 in which said kneading pins are connected to said jacket member by means of a taper pin seat.

18. A jacket member according to claim 17 in which the cone angle of said taper pin seat is chosen such that the kneading pins are self-lockingly connected to said jacket member.

19. A jacket member according to claim 14 in which said kneading pins are inseparably connected to said jacket member.

20. A jacket member according to claim 14 in which said kneading pins are removably connected to said jacket member.

* * * * *